US012683229B2

(12) United States Patent
Wu

(10) Patent No.: US 12,683,229 B2
(45) Date of Patent: *\*Jul. 14, 2026*

(54) BATTERY, POWER CONSUMPTION DEVICE, METHOD FOR PRODUCING BATTERY

(71) Applicant: CONTEMPORARY AMPEREX TECHNOLOGY (HONG KONG) LIMITED, Hong Kong (CN)

(72) Inventor: Xiaozhi Wu, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 261 days.

This patent is subject to a terminal disclaimer.

(21) Appl. No.: 18/601,497

(22) Filed: Mar. 11, 2024

(65) Prior Publication Data

US 2024/0213607 A1 Jun. 27, 2024

Related U.S. Application Data

(63) Continuation of application No. 17/525,228, filed on Nov. 12, 2021, now Pat. No. 11,962,027, which is a
(Continued)

(51) Int. Cl.
*H01M 50/242* (2021.01)
*H01M 50/209* (2021.01)
(Continued)

(52) U.S. Cl.
CPC ....... *H01M 50/242* (2021.01); *H01M 50/209* (2021.01); *H01M 50/249* (2021.01);
(Continued)

(58) Field of Classification Search
None
See application file for complete search history.

(56) References Cited

U.S. PATENT DOCUMENTS

2005/0164077 A1* 7/2005 Bacon .................. H01M 8/248
429/511
2018/0159096 A1 6/2018 Kim et al.
(Continued)

FOREIGN PATENT DOCUMENTS

CN 205723711 U 11/2016
CN 207800693 U 8/2018
(Continued)

OTHER PUBLICATIONS

Machine Translation of JP 2006318871A (Year: 2006).*
(Continued)

*Primary Examiner* — Gregg Cantelmo
(74) *Attorney, Agent, or Firm* — Scully, Scott, Murphy & Presser, P.C.

(57) ABSTRACT

The present application provides a battery including a box body, which includes a first wall and a second wall which is connected to the first wall and extends upward, and a battery module which is arranged in the box body and located above the first wall, the battery module includes a battery cell arrangement structure including a plurality of battery cells stacked along a first direction, and an end plate which is arranged between the second wall and the battery cell arrangement structure, and the end plate is fixedly connected to the battery cell arrangement structure, where a restraint surface is arranged on the second wall, the restraint surface is used to abut against the end plate to restrict the end plate from moving upward, and the end plate is configured to move towards the second wall when the battery cell arrangement structure expands to provide expansion space.

19 Claims, 9 Drawing Sheets

Related U.S. Application Data continuation of application No. PCT/CN2020/135943, filed on Dec. 11, 2020.

(51) Int. Cl.
| | |
|---|---|
| *H01M 50/249* | (2021.01) |
| *H01M 50/264* | (2021.01) |
| *H01M 50/291* | (2021.01) |

(52) U.S. Cl.
CPC ....... *H01M 50/264* (2021.01); *H01M 50/291* (2021.01); *H01M 2220/20* (2013.01)

(56) References Cited

U.S. PATENT DOCUMENTS

| | | | |
|---|---|---|---|
| 2019/0363392 A1 | 11/2019 | Kim et al. | |
| 2020/0411819 A1 | 12/2020 | Seki et al. | |

FOREIGN PATENT DOCUMENTS

| | | | |
|---|---|---|---|
| CN | 207967108 U | | 10/2018 |
| CN | 211017197 U | | 7/2020 |
| CN | 111819712 A | | 10/2020 |
| EP | 3614453 A1 | | 2/2020 |
| JP | 2006318871 A | * | 11/2006 |
| JP | 2017016768 A | | 1/2017 |
| JP | 2020507186 A | | 3/2020 |

OTHER PUBLICATIONS

Extended European Search report dated Jun. 20, 2022 received in European Patent Application No. EP 20934238.5.

Office Action dated Nov. 6, 2023 received in U.S. Appl. No. 17/525,228.

Notice of Reasons for Refusal dated Nov. 6, 2023 received in Japanese patent Application No. JP 2022-555817.

Notice of Allowance dated Feb. 2, 2024 received in U.S. Appl. No. 17/525,228.

International Search report dated Sep. 15, 2021 received in International Application No. PCT/CN2020/135943.

First Notice of Review Observations dated Jun. 13, 2024 received in Chinese Patent Application No. 202080104727.8.

Notice to Grant Patent dated Dec. 11, 2024 received in Chinese Patent Application No. 202080104727.8.

* cited by examiner

1

10 provide a battery module — S1 provide a box body — S2 place the battery module in the box body and dispose the battery module on a first wall of the box body, so that an end plate of the battery module is located between a second wall of the box body and a battery cell arrangement structure — S3

BATTERY, POWER CONSUMPTION DEVICE, METHOD FOR PRODUCING BATTERY

CROSS-REFERENCE TO RELATED APPLICATIONS

This application is a continuation of U.S. Pat. No. 11,962,027, issued on Apr. 16, 2024 which is a continuation of International Application No. PCT/CN2020/135943, filed on Dec. 11, 2020, the entire contents of each of which are incorporated by reference herein for all purposes.

TECHNICAL FIELD

The present application relates to a technical field of batteries, and in particular, to a battery, a power consumption device, and a method for producing a battery.

BACKGROUND

In the prior art, bolt locking is adopted between a battery module and a box body of a battery. However, the bolt locking can occupy space of the box body for accommodating the battery module, resulting in low space utilization in the box body. Moreover, a rigid connection is formed between the battery module and the box body due to use of the bolt locking. During expansion of the battery module, the box body is easily deformed under an action of expansion force, which affects assembly and a service life of the battery. In addition, a battery cell can be pressed by an inner wall of the box body during the expansion, which may cause occurrence of a lithium evolution phenomenon, resulting in a shrinkage of battery capacity.

SUMMARY

Embodiments of the present application aim to provide a battery, a power consumption device, and a method for producing a battery. In the battery, it is conducive to omitting bolt locking between a battery module and a box body. Moreover, it can provide expansion space for the battery module.

In a first aspect, the embodiments of the present application provide a battery, including a box body and a battery module, the box body includes a first wall and a second wall, the second wall is connected to the first wall and extends upward; the battery module is arranged in the box body and located above the first wall, the battery module includes a battery cell arrangement structure and an end plate, the battery cell arrangement structure includes a plurality of battery cells stacked along a first direction, the end plate is arranged between the second wall and the battery cell arrangement structure, and the end plate is fixedly connected to the battery cell arrangement structure; and where a restraint surface is arranged on the second wall, the restraint surface is used to abut against the end plate to restrict the end plate from moving upward, and the end plate is configured to be capable of moving towards the second wall when the battery cell arrangement structure expands, to provide expansion space for the battery cell arrangement structure.

In the above technical solution, the restraint surface restricts the end plate from freely moving upward, which ensures installation locations of the end plate and the battery module in an up and down direction (that is, a height direction of the end plate), and avoids affecting a normal operation of the battery module due to an upward movement of the battery module. On the basis of this, the bolt locking between the battery module and the box body can be omitted, which is conducive to reducing use of parts and increasing space utilization inside the box body.

Moreover, the bolt locking is canceled, so a possibility of deformation of the box body can be reduced while providing the expansion space for expansion of the battery module. Movement of the end plate towards the second wall can provide the expansion space for the battery cell arrangement structure, that is, provide the expansion space for the battery module, so as to release expansion force of the battery cell arrangement structure. Therefore, the deformation of the box body caused by the expansion force can be avoided, which improves installation and assembly reliability and a service life of the box body. Meanwhile, by releasing the expansion force, a possibility of occurrence of battery cell lithium evolution of the battery cell due to excessive extrusion force between the second wall and the end plate can be reduced, which is conducive to the normal operation of the battery.

Optionally, the end plate is provided with a restraint protrusion, and an upper surface of the restraint protrusion is used to abut against the restraint surface to restrict the end plate from moving upward.

In the above technical solution, compared with the bolt locking, a manner that the restraint protrusion abuts against and restrain the restraint surface has advantages of a simple structure and a convenient installation of the battery module in the box body while implementing reliable restraint between the end plate and the box body.

Optionally, the restraint protrusion extends horizontally towards the second wall.

In the above technical solution, the restraint protrusion extends towards the second wall along a horizontal direction, so a direction in which the restraint protrusion may move is perpendicular to an extending direction, so that it is not easy to slide between the restraint protrusion and the restraint surface, which can improve restraint reliability of the restraint protrusion and the restraint surface.

Optionally, the upper surface of the restraint protrusion has a gap with the restraint surface in an up and down direction when the battery cell arrangement structure is not expanded.

In the above technical solution, there is a gap in the up and down direction, so the restraint surface will not interfere with a horizontal movement of the restraint protrusion, which is conducive to a smooth movement of the restraint protrusion to a lower part of the restraint surface.

Optionally, the restraint protrusion has a gap with the second wall in the first direction when the battery cell arrangement structure is not expanded, so that the end plate can move towards the second wall to provide the expansion space for the battery cell arrangement structure.

Optionally, the second wall is partially recessed towards a surface of the end plate to form a groove, and an upper side wall of the groove is the restraint surface.

In the above technical solution, the upper side wall of the groove constructs the restraint surface, which not only does not occupy the space of the box body for accommodating the battery module, but also is conducive to lightweight of the box body.

Optionally, the end plate further includes an end plate body, the end plate body has a first surface facing the battery cell arrangement structure and a second surface facing away from the battery cell arrangement structure, and the restraint protrusion is arranged on the second surface.

In the above technical solution, the second surface is a large surface (a surface with a larger area) of the end plate body, so it is convenient to arrange the restraint protrusion. Moreover, the second surface is the large surface, so it is convenient to arrange a longer restraint protrusion along a length direction of the end plate, so as to increase the restraint reliability of the battery module in the box body in the up and down direction as much as possible.

Optionally, the end plate includes a first elastic support portion, and the first elastic support portion is configured to be capable of abutting against the second wall and be pressed and deformed by the battery cell arrangement structure when the battery cell arrangement structure expands, to provide the expansion space for the battery cell arrangement structure.

In the above technical solution, the first elastic support portion deforms itself to provide the expansion space, and the deformation is reliable. It can provide the expansion space for the battery cell arrangement structure in time to release the expansion force of the battery cell arrangement structure, and can reduce the possibility of the deformation of the box body caused by the expansion force, which improves the installation reliability and a service life of the box body. Meanwhile, by releasing the expansion force, the possibility of the occurrence of the lithium evolution of the battery cell due to the excessive extrusion force between the second wall and the end plate can be reduced, which is conducive to the normal operation of the battery.

Optionally, at least a part of the first elastic support portion extends obliquely upward towards the second wall.

In the above technical solution, when the end plate is pressed, since the first elastic support portion has an inclination angle, the first elastic support portion is more easily deformed when being pressed by the second wall, which can provide the expansion space for the battery cell arrangement structure in time.

Optionally, the end plate further includes an end plate body, the end plate body has the first surface facing the battery cell arrangement structure and the second surface facing away from the battery cell arrangement structure, and the first elastic support portion is arranged on the second surface.

In the above technical solution, the second surface is the large surface of the end plate body, which is convenient to arrange the first elastic support portion. In addition, since the second surface is the large surface, which is convenient to arrange more first elastic support portions, it is conducive to dispersing the expansion force of the battery cell arrangement structure, and reducing the possibility of the occurrence of the lithium evolution caused by compression on the battery cell due to the concentrated extrusion force.

Optionally, the end plate is provided with a restraint protrusion, and an upper surface of the restraint protrusion is used to abut against the restraint surface to restrict the end plate from moving upward, the restraint protrusion is arranged on the second surface, and a height of the first elastic support portion protruding from the second surface is greater than a height of the restraint protrusion protruding from the second surface.

In the above technical solution, during the movement of the end plate towards the second wall, the first elastic support portion can abut against the second wall and deform itself to provide the expansion space before the restraint protrusion abuts against the second wall.

Optionally, an orthographic projection of the first elastic support portion on a horizontal plane is a long-strip shape, a surface on which a long side of the long-strip shape is located is connected to the second surface, and a surface on which the other long side of the long-strip shape is located is used to abut against the second wall, so as to facilitate uniform dispersion of the expansion force of the battery cell arrangement structure in a width direction of the end plate.

Optionally, there are a plurality of the first elastic support portions, and the plurality of the first elastic support portions are arranged at intervals on the second surface along the up and down direction, so as to facilitate the uniform dispersion of the expansion force, which improves stress consistency of each place on a plane where the battery cell arrangement structure is in contact with the end plate, and improves the stress consistency of the battery cell.

Optionally, the box body includes a pair of second walls, the pair of second walls are arranged opposite to each other along the first direction, and the first elastic support portion abuts against the second wall when the battery cell arrangement structure is not expanded, to implement a positioning of the battery module in the first direction.

In the above technical solution, when the battery module is installed in the box body, the first elastic support portion provides an installation positioning in the first direction for the battery module, which ensures the installation reliability of the battery module in the first direction.

Optionally, the battery module is in interference fit with the box body, and the first elastic support portion is configured to absorb interference magnitude in the first direction by producing elastic deformation.

In the above technical solution, when the battery cell arrangement structure is not expanded, the first elastic support portion abuts against the second wall and is in a deformed state. In addition to providing the installation positioning in the first direction for the battery module as mentioned above, this arrangement also has at least the following two advantages: first, after the battery module is assembled in place, the first elastic support portion provides assembly allowance in the first direction for the battery module, so that a size error of the battery module in the first direction can be offset by the deformation of the first elastic support portion, for example, when a size of the battery module in the first direction is larger than an installation size of the box body in a corresponding direction, the battery module can be smoothly loaded in the box body through the deformation of the first elastic support portion, and thus requirements on processing and assembly accuracy of the battery module in the first direction are reduced; second, when the battery module is assembled in place, since the first elastic support portion is in the deformed state, reaction force of the second wall can be sent to the battery cell arrangement structure, as the battery cell is subjected to a certain amount of pressure, it is conducive to ensuring a good contact of interfaces of a positive electrode sheet and a negative electrode sheet inside the battery cell.

Optionally, the box body further includes a pair of third walls, the pair of third walls are connected to the first wall and extend upward, the pair of third walls are arranged opposite to each other along a second direction, and the second direction intersects the first direction; and the end plate further includes a second elastic support portion, and the second elastic support portion is used to abut against the third wall to implement a positioning of the battery module in the second direction.

In the above technical solution, when the battery module is installed in the box body, the second elastic support portion abuts against the third wall, which provides an installation positioning in the second direction for the battery module, and ensures the installation reliability of the battery module in the second direction.

Optionally, the battery module is in interference fit with the box body, and the second elastic support portion is configured to absorb interference magnitude in the second direction by producing elastic deformation.

In the above technical solution, when the battery cell arrangement structure is not expanded, the second elastic support portion abuts against the third wall and is in the deformed state. In addition to providing the installation positioning in the second direction for the battery module as mentioned above, this arrangement also has at least the following two advantages: first, after the battery module is assembled in place, the second elastic support portion provides the assembly allowance in the second direction for the battery module, so that the size error of the battery module in the second direction can be offset by the deformation of the second elastic support portion, for example, when the size of the battery module in the second direction is larger than the installation size of the box body in a corresponding direction to, the battery module can be smoothly loaded in the box body through the deformation of the second elastic support portion, and thus the requirements on the processing and assembly accuracy of the battery module in the second direction are reduced; second, when the battery module is assembled in place, since the second elastic support portion is in the deformed state, the reaction force of the third wall can be sent to the battery cell arrangement structure, as the battery cell is subjected to the certain amount of the pressure, it is conducive to ensuring the good contact of the interfaces of the positive electrode sheet and the negative electrode sheet inside the battery cell.

Optionally, the end plate further includes an end plate body, the second elastic support portion includes a first section and a second section, the first section extends obliquely upward from the end plate body towards the third wall, the second section extends upward from an end of the first section away from the end plate body, and the second section is used to abut against the third wall.

In the above technical solution, the first section is arranged obliquely upward, which can play a certain guide role. The second section extends along the up and down direction, and can form surface contact with the third wall, which is conducive to extrusion and fitting of the two. Moreover, the second section has a gap with the end plate body, which is conducive to the deformation of the second section when being pressed by the third wall.

Optionally, the end plate further includes an end plate body and a guide portion, the guide portion is located below the second elastic support portion, the guide portion has a guide chamfer, and the guide chamfer is used to guide when the end plate is loaded in the box body.

Optionally, a lower end of the battery cell arrangement structure is attached to the first wall, and a lower end of the end plate has a gap with the first wall, so as to ensure contact between the battery cell arrangement structure and the first wall.

In a second aspect, a power consumption device is provided, including the battery provided by the first aspect according to the embodiments of the present application.

In a third aspect, a method for producing a battery is provided, including:

providing a battery module, the battery module includes a battery cell arrangement structure and an end plate, the battery cell arrangement structure includes a plurality of battery cells stacked upon each other, and the end plate is fixedly connected to the battery cell arrangement structure; providing a box body, the box body includes a first wall and a second wall, the second wall is connected to the first wall and extends upward, the second wall is provided with a restraint surface, and the restraint surface is used to abut against the end plate to restrict the end plate from moving upward; and putting the battery module into the box body and placing the battery module on the first wall, so that the end plate is located between the second wall and the battery cell arrangement structure, and the end plate is capable of moving towards the second wall when the battery cell arrangement structure expands, to provide expansion space for the battery cell arrangement structure.

Optionally, the battery module is put into the box body and placed on the first wall, including: applying extrusion force to the battery module to compress a length of the battery module; putting the battery module in a compressed state into the box body and placing the battery module on the first wall; and removing the extrusion force to restore the length of the battery module, so that at least a part of the end plate moves to a lower part of the restraint surface.

BRIEF DESCRIPTION OF DRAWINGS

In order to illustrate the technical solution in embodiments of the present application more clearly, brief description will be made below to the drawings required in the embodiments, and it should be understood that the following drawings only show some embodiments of the present application, therefore, should not to be regarded as the restriction to the scope, and other related drawings could be obtained based on these drawings by those ordinary skilled in this art without creative efforts.

DESCRIPTION OF EMBODIMENTS

Figure 1:
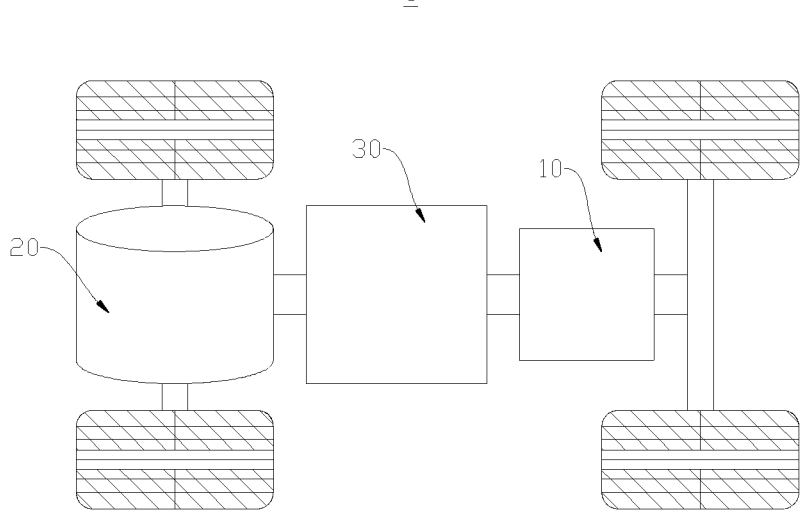
FIG. 1 is a schematic diagram of a vehicle provided by an embodiment of the present application.

In order to make the objectives, technical solutions and advantages of embodiments of the present application clearer, the technical solutions in the embodiments of the present application will be clearly and completely described below with reference to the accompanying drawings in the embodiments of the present application. Apparently, the described embodiments are some of, rather than all of, the embodiments of the present application. Components of the embodiments of the present application generally described and shown in the accompanying drawings herein may be arranged and designed in various different configurations.

Therefore, the following detailed description of the embodiments of the present application provided in the accompanying drawings is not intended to limit the scope of the present application claimed for protection, but merely indicates the selected embodiments of the present application. All the other embodiments obtained by those ordinary skilled in the art based on the embodiments of the present application without any creative effort shall fall within the scope of protection of the present application.

It should be noted that, the embodiments in the present application and features in the embodiments may be mutually combined provided that no conflict is caused. It should be noted that similar reference numerals and letters indicate similar items in the following accompany drawings. Therefore, once a certain item is defined in one drawing, it does not need to be further defined and explained in the subsequent drawings.

In the description of the embodiments of the present application, it should be noted that orientations or positional relationships indicated by terms such as "up", "down", "inside" and "outside" are orientations or positional relationships shown based on the accompany drawings, or the orientations or positional relationships commonly placed when the application product is used, or the orientations or positional relationships commonly understood by those skilled in the art, or the orientations or positional relationships commonly placed when the application product is used, and the terms are merely for convenience of describing the present application and for simplifying the description, but for indicating or implying that an indicated apparatus or element must have a specific orientation, and must be constructed and operated in the specific orientation, which thus may not be understood as limiting the present application. In addition, the terms "first", "second", "third" and the like are only intended for distinguishing description, and shall not be understood as an indication or implication of relative importance.

In the description of the present application, it also should be noted that unless otherwise explicitly specified and defined, the terms "setting", "mounting", "connecting" and "connection" should be understood in a broad sense, for example, they may be a fixed connection, a detachable connection, or an integrated connection, may be a mechanical connection, or may be an electrical connection; may be a direct connection and may also be an indirect connection via an intermediate medium, or may be communication between the interiors of two elements. Those ordinary skilled in the art can appreciate the specific meanings of the foregoing terms in the present application according to specific conditions.

An application of a battery generally includes three levels: a battery cell, a battery module and a battery pack. The battery cell includes a positive electrode plate, a negative electrode plate, an electrolyte and a separator. The separator is arranged between the positive electrode plate and the negative electrode plate to prevent an internal short circuit. Generally, the battery cell can be divided into three types according to a packaging mode: a cylindrical battery cell, a square battery cell and a soft pack battery cell.

The battery module refers to a single physical module including a plurality of battery cells to provide a higher voltage and/or capacity. In the battery module, the plurality of battery cells can be connected in series and/or in parallel via a bus bar, so as to be used in various applications, for example, in some high-power applications such as electric vehicles.

The battery pack is constructed by assembling components such as a battery management system on the basis of one or more battery modules, and loading the components in a sealed box body, the sealed box body is then connected to power consumption devices such as the electric vehicles. The battery mentioned in the present application can be the battery pack.

In the battery of the prior art, in order to install the battery module in the box body and restrict the battery module from freely moving upward in the box body, an end plate of the battery module is generally installed on a side wall of the box body via a fastener (such as a locking bolt). In order that the fastener can be easily installed, a thickness size of the side wall of the box body is relatively large. Therefore, it is not conducive to increasing space of the box body for accommodating the battery module, which reduces space utilization in the box body.

In addition, for the battery of the prior art, during expansion of the battery module, a part of expansion force can be released to a certain extent through local deformation of the end plate. However, due to use of bolt locking between the end plate and the box body, a rigid connection is formed between the two. Therefore, the box body is bound to be affected during the deformation of the end plate, which may cause the deformation of the box body. However, if it is desired to avoid the deformation of the box body due to the deformation of the end plate, the local deformation of the end plate can be small, which is not conducive to providing sufficient expansion space for the battery module. And the battery cell can still be pressed by an inner wall of the box body during the expansion, which may cause occurrence of a lithium evolution phenomenon, resulting in a shrinkage of battery capacity.

In view of this, some embodiments of the present application provide a battery 10. In the battery 10, in the case of canceling the bolt locking between a battery module 200 and a box body 100, an upward movement of the battery module 200 can also be restrained, which is conducive to improving the space utilization in the box body 100. Moreover, the expansion space can be provided for the battery module 200 to release the expansion force, which is conducive to decreasing a possibility of the occurrence of the lithium evolution caused by compression on the battery cell 211.

The embodiments of the present application provide a power consumption device using the battery 10 as a power supply, and the power consumption device can be, but is not limited to, a vehicle 1, a ship or an aircraft.

It can be understood that the battery 10 described in the embodiments of the present application is applicable to various devices using batteries, such as mobile phones, notebook computers, battery carts, electric vehicles, ships, spacecrafts, electric toys and electric tools, etc., for example, the spacecrafts include rockets, space shuttles and spaceships, etc.; the electric toys include fixed or mobile electric toys, such as game consoles, electric vehicle toys, electric ship toys and electric airplane toys, etc.; the electric tools include metal cutting power tools, grinding power tools, assembly power tools and railway power tools, such as electric drills, electric grinders, electric wrenches, electric screwdrivers, electric hammers, concrete vibrators, and electric planers.

The battery 10 described in the embodiments of the present application is not only applicable to the power consumption device described above, but also applicable to all devices that use the battery 10.

As shown in FIG. 1, FIG. 1 is a structural schematic diagram of a vehicle 1 according to an embodiment of the present application. The vehicle 1 can be a fuel-powered vehicle, a gas-powered vehicle or a new energy vehicle, and the new energy vehicle can be a battery electric vehicle, a hybrid vehicle, an extended-range vehicle, or the like. The battery 10, a motor 20 and a controller 30 can be arranged in the vehicle 1, and the controller 30 is used to control the battery 10 to supply power to the motor 20, for example, the battery 10 is arranged at the bottom or the head of the vehicle 1. The battery 10 can be used to supply power to the vehicle 1, for example, the battery 10 can be used as an operation power supply of the vehicle 1 and is used for a circuit system of the vehicle 1, for example, for a working power demand of the vehicle 1 during startup, navigation and operation.

In another embodiment of the present application, the battery 10 can be used not only as the operation power supply of the vehicle 1 but also as a driving power supply of the vehicle 1, replacing or partially replacing fuel or natural gas to provide driving power for the vehicle 1.

Figure 2:
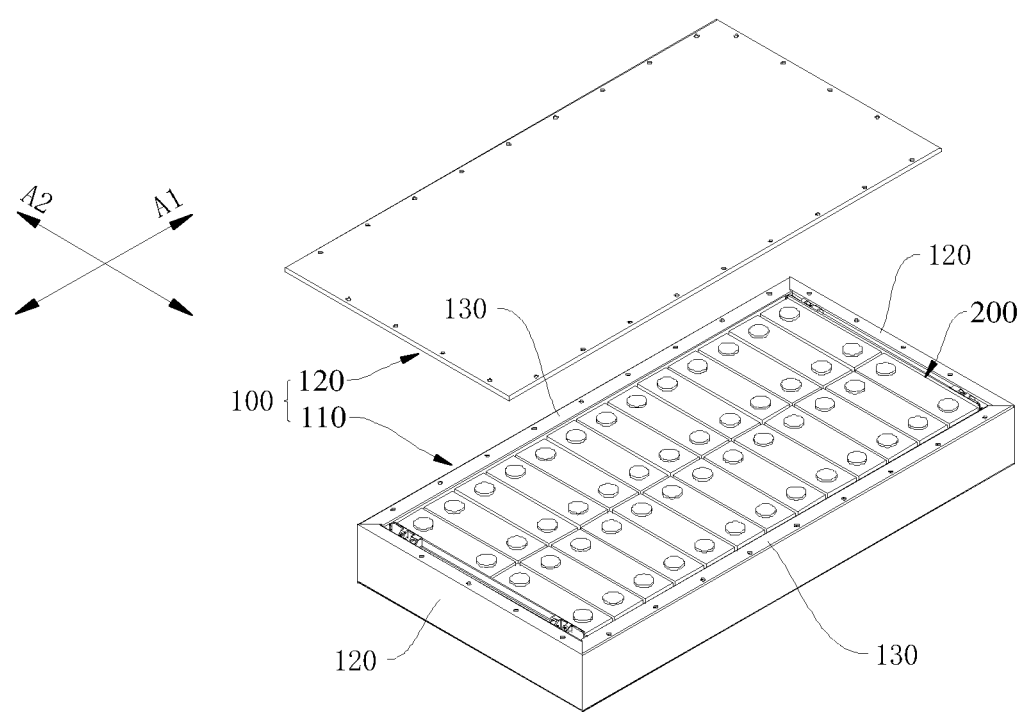
FIG. 2 is an exploded schematic diagram of a battery provided by an embodiment of the present application.
Figure 3:
FIG. 3 is an exploded schematic diagram of a battery provided by an embodiment of the present application, where an upper cover body is not shown.
Figure 3:
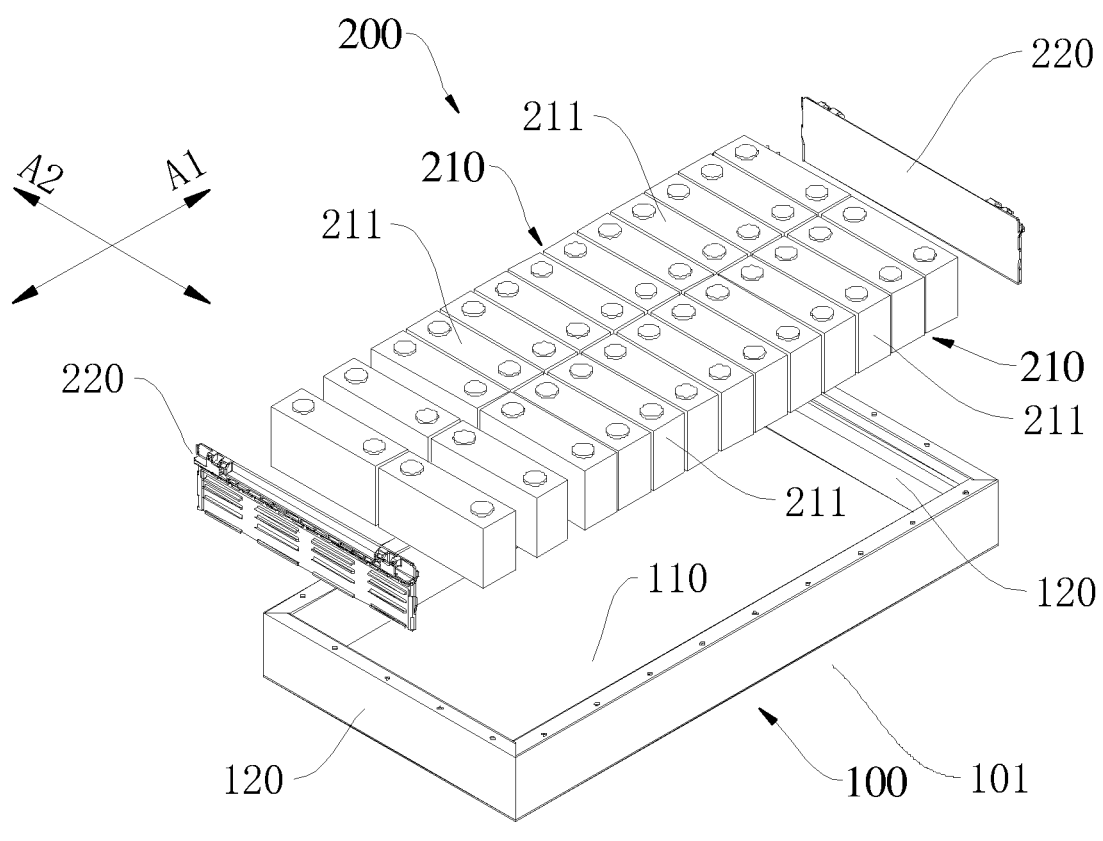

In some embodiments of the present application, the vehicle 1 can be powered by the battery 10 as shown in FIG. 2. The battery 10 includes the battery module 200 and the box body 100, and the battery module 200 is arranged in the box body 100. As shown in FIG. 2 and FIG. 3, the box body 100 includes a first wall 110 and a second wall 120, the second wall 120 is connected to the first wall 110 and extends upward, that is, the first wall 110 is a bottom wall of the box body 100, and the second wall 120 is a side wall connected to the bottom wall. The battery module 200 is arranged in the box body 100 and located above the first wall 110. The battery module 200 includes a battery cell arrangement structure 210 and an end plate 220, the battery cell arrangement structure 210 includes a plurality of battery cells 211 stacked along a first direction A1, the end plate 220 is arranged between the second wall 120 and the battery cell arrangement structure 210, and the end plate 220 is fixedly connected to the battery cell arrangement structure 210.

Figure 4:
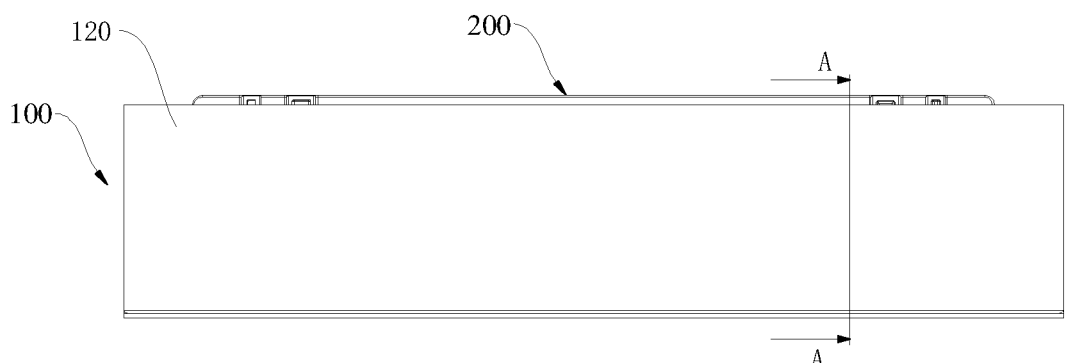
FIG. 4 is a left side schematic diagram of a battery provided by an embodiment of the present application.
Figure 5:
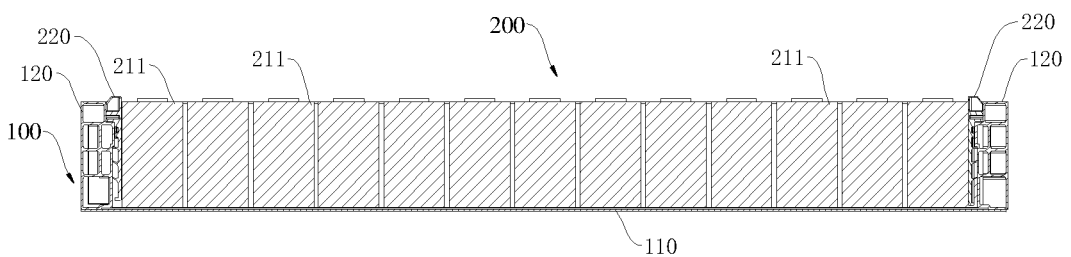
FIG. 5 is a cross-sectional schematic diagram along A-A line in FIG. 4.
Figure 6:
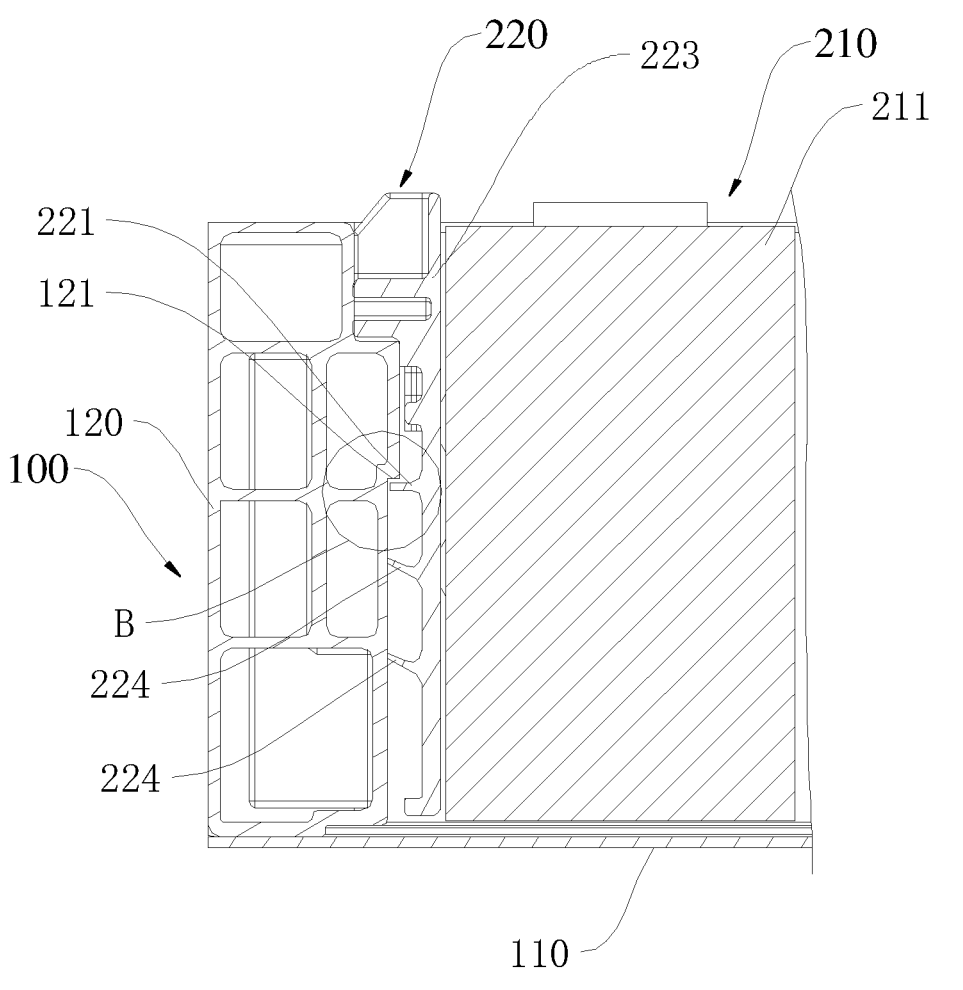
FIG. 6 is a partially enlarged schematic diagram of FIG. 5.

Among them, as shown in FIGS. 4-6, a restraint surface 121 is arranged on the second wall 120, and the restraint surface 121 is used to abut against the end plate 220 to restrict the end plate 220 from moving upward. The end plate 220 is configured to move towards the second wall 120 when the battery cell arrangement structure 210 expands, to provide expansion space for the battery cell arrangement structure 210.

In the above technical solution, the restraint surface 121 restricts the end plate 220 from freely moving upward, which ensures installation locations of the end plate 220 and the battery module 200 in an up and down direction (that is, a height direction of the end plate 220), and avoids affecting a normal operation of the battery module 200 due to an upward movement of the battery module 200. On the basis of this, the bolt locking between the battery module 200 and the box body 100 can be omitted, which is conducive to reducing use of parts and increasing the space utilization in the box body 100. Meanwhile, the bolt locking is omitted to simplify assembly process and improve production efficiency.

Moreover, the bolt locking is canceled, so a possibility of deformation of the box body 100 can be reduced while providing the expansion space for the battery module 200. Since the battery cell arrangement structure 210 includes a plurality of battery cells 211 in the first direction A1, the battery module 200 mainly expands along the first direction A1 when expanding. In addition, since the end plate 220 is configured to move towards the second wall 120 when the battery cell arrangement structure 210 expands, that is, move in the first direction A1, when the battery cell arrangement structure 210 expands, movement of the end plate 220 towards the second wall 120 can provide the expansion space for the battery cell arrangement structure 210, that is, provide the expansion space for the battery module 200, so as to release expansion force of the battery cell arrangement structure 210. Therefore, the possibility of the deformation of the box body 100 caused by the expansion force can be reduced, which improves assembly reliability and a service life of the box body 100. Meanwhile, by releasing the expansion force, a possibility of occurrence of the lithium evolution of the battery cell 211 due to excessive extrusion force between the second wall 120 and the end plate 220 can be reduced, which is conducive to the normal operation of the battery 10.

The end plate 220 and the battery cell arrangement structure 210 can be fixedly connected in any suitable manner, for example, bonding, strap connection, or using an end side plate to connect the end plate 220 and the battery cell arrangement structure 210, and the embodiments of the present application are not limited thereto.

In an embodiment of the present application, as shown in FIG. 2 and FIG. 3, the box body 100 can include a lower box body 101 and an upper cover body 102, the upper cover body 102 is sealed and covered on the lower box body 101, and the battery module 200 can be installed in the lower box body 101. The first wall 110 can be a bottom wall of the lower box body 101, and the second wall 120 can be a side wall of the lower box body 101.

The restraint surface 121 can be constructed by any suitable structure. As shown in FIGS. 4-6, in an embodiment of the present application, the second wall 120 is partially recessed towards a surface of the end plate 220 to form a groove, and an upper side wall of the groove is the restraint surface 121. The upper side wall of the groove constructs the restraint surface 121, which not only does not occupy the space of the box body 100 for accommodating the battery module 200, but also is conducive to lightweight of the box body 100.

Of course, in other embodiments of the present application, a protrusion portion extending towards the end plate 220 is arranged on the second wall 120, and a side of the end plate 220 facing the second wall 120 is formed with the groove for fitting the protrusion portion. After the battery module 200 is installed in place, the protrusion portion on the second wall 120 is inserted into the groove, and a lower surface of the protrusion portion is constructed as the restraint surface 121 to restrain the upward movement of the end plate 220.

As shown in FIG. 6, in an embodiment of the present application, the end plate 220 is provided with a restraint protrusion 221, and an upper surface of the restraint protrusion 221 is used to abut against the restraint surface 121 to restrict the end plate 220 from moving upward. Compared with the bolt locking, a manner that the restraint protrusion 221 abuts against and restrain the restraint surface 121 has advantages of a simple structure and a convenient installation of the battery module 200 in the box body 100 while implementing reliable restraint between the end plate 220 and the box body 100.

In order to ensure a restraint effect of the restraint protrusion 221, as shown in FIG. 6, in an embodiment of the present application, the restraint protrusion 221 extends horizontally towards the second wall 120. On the basis of this, when the battery module 200 expands, a direction (upward) in which the restraint protrusion 221 may move is perpendicular to an extending direction, so that it is not easy to slide between the restraint protrusion 221 and the restraint surface 121, which can improve restraint reliability of the restraint protrusion 221 and the restraint surface 121.

Further, as shown in FIG. 6, the restraint surface 121 can be a surface parallel to a horizontal plane. In this way, when the restraint protrusion 221 abuts against the restraint surface 121, the two surfaces are fully fitted, which further improves the restraint reliability of the restraint protrusion 221 and the restraint surface 121.

When assembling the battery 10, first, the extrusion force can be applied to the battery module 200 to compress a length of the battery module 200 in the first direction A1; then the battery module 200 in a compressed state is put into the box body 100 and placed on the first wall 110; next, the extrusion force is removed to restore the length of the battery module 200, so that the restraint protrusion 221 of the end plate 220 moves to a lower part of the restraint surface 121.

Figure 7:
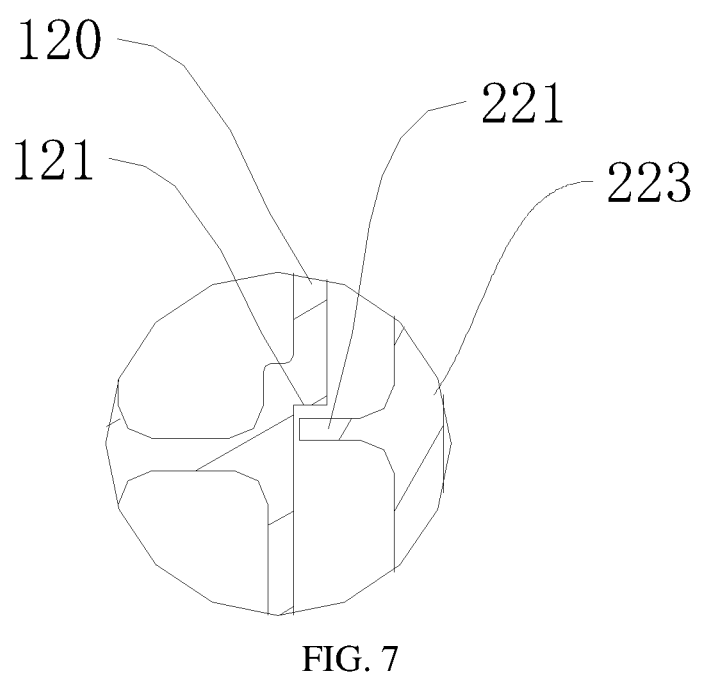
FIG. 7 is an enlarged schematic diagram of a portion B of FIG. 6.

In order that the restraint protrusion 221 can smoothly move to the lower part of the restraint surface 121 after the compression is removed, as shown in FIG. 6 and FIG. 7, in an embodiment of the present application, after the battery module 200 is installed in place in the box body 100, the upper surface of the restraint protrusion 221 has a gap with the restraint surface 121 in the up and down direction when the battery cell arrangement structure 210 is not expanded. On the basis of this, after the extrusion force pressing the end plate 220 is removed, since there is a gap in the up and down direction, the restraint surface 121 will not interfere with a horizontal movement of the restraint protrusion 221, which is conducive to the smooth movement of the restraint protrusion 221 to the lower part of the restraint surface 121.

As shown in FIG. 6 and FIG. 7, optionally, after the battery module 200 is installed in place in the box body 100, the restraint protrusion 221 also has a gap with the second wall 120 in the first direction A1 when the battery cell arrangement structure 210 is not expanded, so that the end plate 220 can move towards the second wall 120, so as to provide the expansion space for the battery cell arrangement structure 210.

In this way, during the expansion of the battery cell arrangement structure 210, the movement of the restraint protrusion 221 towards the second wall 120 can be divided into two stages. In a first stage, the restraint protrusion 221 moves towards the second wall 120 along the first direction A1 until it abuts on the second wall 120. If the battery cell arrangement structure 210 continues to expand after the restraint protrusion 221 abuts on the second wall 120, then the end plate 220 can be locally deformed, so as to continue to provide the expansion space.

Figure 8:
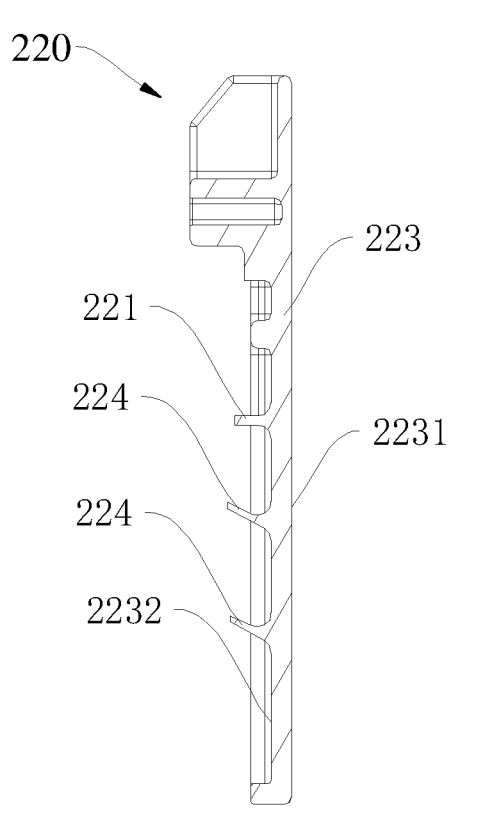
FIG. 8 is a cross-sectional schematic diagram along a first direction of an end plate provided by an embodiment of the present application.

As shown in FIG. 8, the end plate 220 can further include an end plate body 223, the end plate body 223 has a first surface 2231 facing the battery cell arrangement structure 210 and a second surface 2232 facing away from the battery cell arrangement structure 210, and the restraint protrusion 221 is arranged on the second surface 2232. The second surface 2232 is a large surface (a surface with a larger area) of the end plate body 223, which is convenient to arrange the restraint protrusion 221. Moreover, the second surface 2232 is the large surface, so it is convenient to arrange a longer restraint protrusion 221 along a length direction (a direction perpendicular to the first direction A1) of the end plate 220, so as to increase the restraint reliability of the battery module 200 in the box body 100 in the up and down direction as much as possible.

It can be understood that in other embodiments of the present application, the restraint protrusion 221 can also be arranged on two side surfaces in a thickness direction (the first direction A1) of the end plate body 223, that is, arranged on a small surface (the surface with a smaller area) of the end plate body 223, and extend towards the second wall 120.

In an embodiment of the present application, an orthographic projection of the restraint protrusion 221 on a horizontal plane is a long-strip shape, a surface on which a long side of the long-strip shape is located is connected to the second surface 2232. The restraint protrusion 221 is the long-strip shape, which is conducive to increasing a contact area between the restraint protrusion 221 and the restraint surface 121, so that it is conducive to enhancing the restraint effect of the restraint protrusion 221.

As shown in FIGS. 6-11, in the embodiments of the present application, the end plate 220 further includes a first elastic support portion 224, and the first elastic support portion 224 is configured to abut against the second wall 120 and be pressed and deformed by the battery cell arrangement structure 210 when the battery cell arrangement structure 210 expands. The first elastic support portion 224 deforms itself to provide the expansion space and the deformation is reliable, which can provide the expansion space for the battery cell arrangement structure 210 in time to release the expansion force of the battery cell arrangement structure 210, and thus can reduce the possibility of the deformation of the box body 100 caused by the expansion force, which improves the installation reliability and the service life of the box body 100. Meanwhile, by releasing the expansion force, the possibility of the occurrence of the battery cell lithium evolution of the of the battery cell 211 due to the excessive extrusion force between the second wall 120 and the end plate 220 can be reduced, which is conducive to the normal operation of the battery 10.

In order that the first elastic support portion 224 can be easily deformed when being compressed, as shown in FIG. 6, in an embodiment of the present application, at least a part of the first elastic support portion 224 extends obliquely upward towards the second wall 120. On the basis of this, when the end plate 220 is pressed, the first elastic support portion 224 has an inclination angle, so the first elastic support portion 224 is more easily deformed when being pressed by the second wall 120, which can provide the expansion space for the battery cell arrangement structure 210 in time.

It should be noted that an upward inclination angle of the first elastic support portion 224 can be any angle as long as it can met deformation needs. The embodiments of the present application do not limit the upward inclination angle of the first elastic support portion 224.

Figure 9:
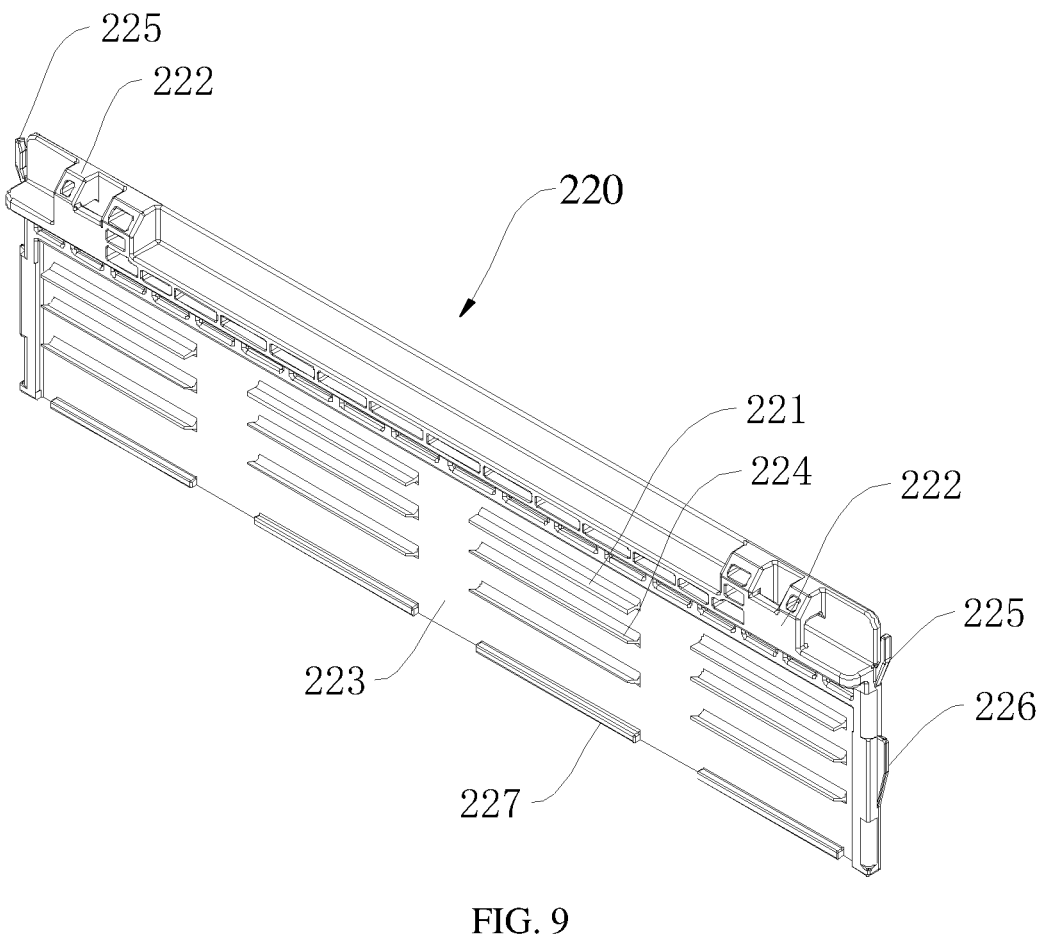
FIG. 9 is a stereoscopic schematic structural diagram of an end plate provided by an embodiment of the present application.

As shown in FIG. 8 and FIG. 9, in an embodiment of the present application, the first elastic support portion 224 can be arranged on the second surface 2232. As mentioned above, the second surface 2232 is the large surface of the end plate body 223, which is convenient to arrange the first elastic support portion 224. In addition, since the second surface 2232 is the large surface (the surface with the larger area), which is convenient to arrange more first elastic support portions 224, it is conducive to dispersing the expansion force of the battery cell arrangement structure 210, and reducing the possibility of the occurrence of the lithium evolution caused by the compression on the battery cell 211 due to the concentrated extrusion force.

It can be understood that in other embodiments of the present application, the first elastic support portion 224 can also be arranged on two side walls in the thickness direction (the first direction A1) of the end plate body 223, that is, arranged on the small surface (the surface with the smaller area) of the end plate body 223, and extend towards the second wall 120.

In the embodiments of the present application, in order to prevent the restraint protrusion 221 from interfering with the deformation of the first elastic supporting portion 224, as shown in FIG. 6 and FIG. 8, a height of the first elastic supporting portion 224 protruding from the second surface 2232 is greater than a height of the restraint protrusion 221 protruding from the second surface 2232. In this way, during the movement of the end plate 220 towards the second wall 120, the first elastic support portion 224 can abut against the second wall 120 and deform itself to provide the expansion space before the restraint protrusion 221 abuts against the second wall 120.

In order to disperse the expansion force of the battery cell arrangement structure 210 as much as possible, in an embodiment of the present application, an orthographic projection of the first elastic support portion 224 on a horizontal plane is a long-strip shape, a surface on which a long side of the long-strip shape is located is connected to the second surface 2232, and a surface on which the other long side of the long-strip shape is located is used to abut against the second wall 120. In other words, the first elastic support portion 224 is arranged on the second surface 2232 along the length direction of the end plate 220. In this way, it is conducive to dispersing the expansion force of the battery cell arrangement structure 210 in the length direction of the end plate 220.

In order that the first elastic support portion 224 can be easily deformed, as shown in FIG. 8, optionally, the first elastic support portion 224 can be formed as a sheet shape. That is, in the embodiment, the first elastic support portion 224 is constructed as a sheet shape structure extending obliquely upward.

It should be noted that the embodiments of the present application do not limit a specific structure of the first elastic support portion 224. For example, the first elastic support portion 224 can also be constructed as a horizontal protrusion extending along the first direction A1, and the first elastic support portion 224 is provided with a groove or other strength weakening structures to weaken strength of the first elastic support portion 224, so that the first elastic support portion 224 is easily deformed when being pressed by the second wall 120. In addition, the first elastic support portion 224 can also be a spring, one end of the spring is connected to (for example, welded) the second surface 2232, and the other end extends towards the second wall 120.

As shown in FIGS. 6-10, in an embodiment of the present application, there are a plurality of the first elastic support portions 224, and the plurality of the first elastic support portions 224 are arranged at intervals on the second surface 2232 along the up and down direction, so as to facilitate uniform dispersion of the expansion force and improve stress consistency of each place on a plane where the battery cell arrangement structure 210 is in contact with the end plate 220, which improves the stress consistency of the battery cell 211.

Figure 10:
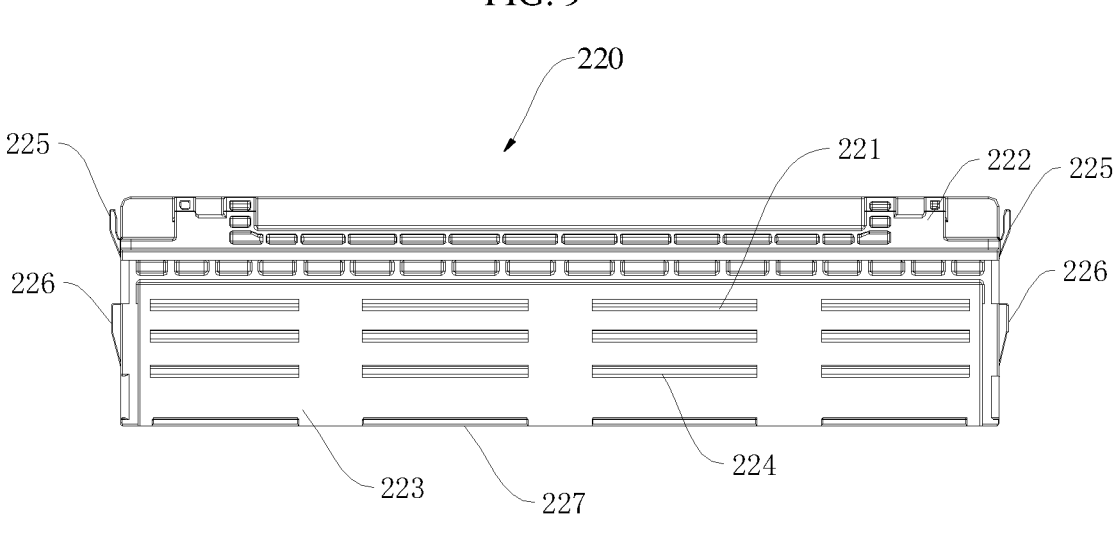
FIG. 10 is a side view schematic diagram of an end plate provided by an embodiment of the present application.

Further, as shown in FIG. 10, the plurality of the first elastic support portions 224 can be arranged in a rectangular array on the second surface 2232, to further disperse the expansion force transmitted from the entire battery cell arrangement structure 210 to the end plate 220, to further improve the stress consistency of each place of the battery cell arrangement structure 210 and improve the stress consistency of the battery cell 211.

Figure 11:
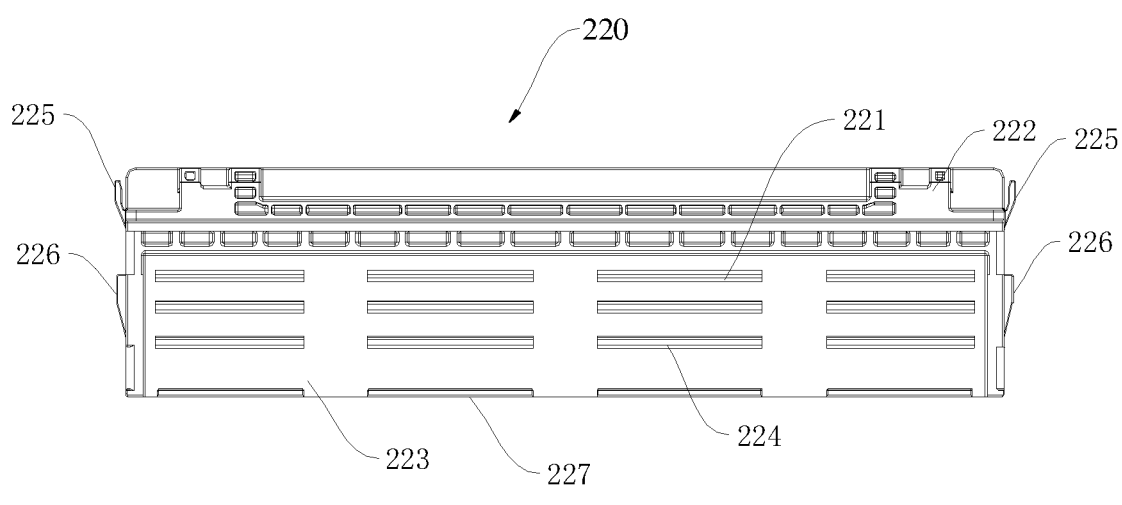
FIG. 11 is a side view schematic diagram of an end plate provided by another embodiment of the present application.

As shown in FIG. 11, in another embodiment of the present application, there are the plurality of the first elastic support portions 224, the plurality of the first elastic support portions 224 are arranged at intervals on the second surface 2232 along the up and down direction, each first elastic support portion 224 extends in the length direction of the end plate body 223, and the extension of the first elastic support portions 224 in the length direction of the end plate body 223 is not interrupted.

In an embodiment of the present application, the battery module 200 is bonded to the first wall 110 via glue. As shown in FIGS. 9-11, a lower end of the end plate 220 is also provided with an extension portion 227, which can play a role of blocking structural glue and avoid the upward movement of the structural glue to a certain extent.

As shown in FIGS. 9-11, in an embodiment of the present application, an upper end of the end plate 220 is also provided with a clamping portion 222, which is used to facilitate an assembly tool to clamp the battery module 200 when the battery module 200 is loaded in the box body 100.

Figure 12:
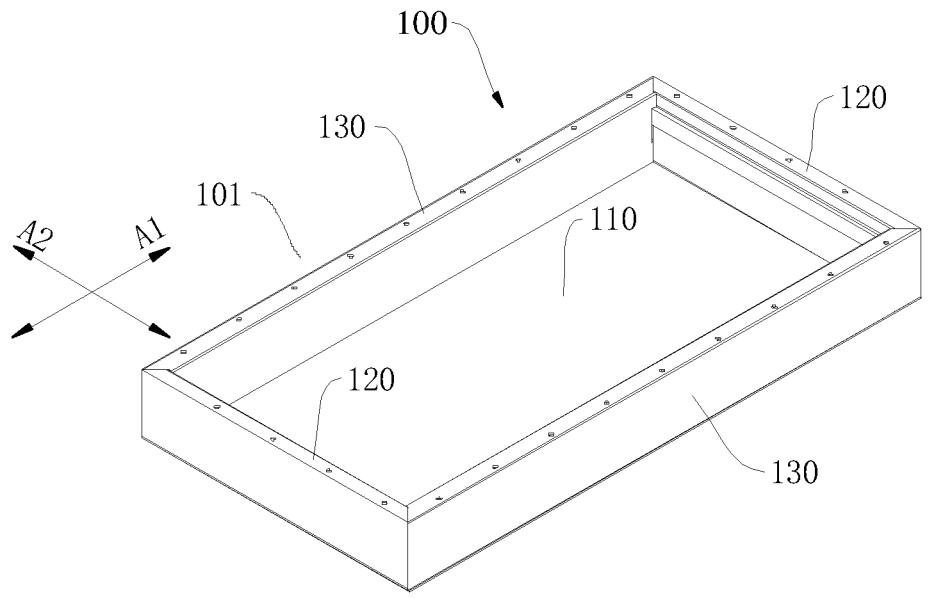
FIG. 12 is a stereoscopic structural schematic diagram of a box body of a battery provided by an embodiment of the present application, where an upper cover body is not shown.

As shown in FIGS. 2, 3 and 12, in the embodiments of the present application, the box body 100 (the lower box body 101) can include a pair of second walls 120, the pair of second walls 120 are arranged opposite to each other along the first direction A1. The first elastic support portion 224 can abut against the second wall 120 when the battery cell arrangement structure 210 is not expanded, to implement a positioning of the battery module 200 in the first direction A1. On the basis of this, after the battery module 200 is installed in the box body 100, the first elastic support portion 224 provides an installation positioning in the first direction A1 for the battery module 200, which ensures the installation reliability of the battery module 200 in the first direction A1.

It should be noted that in the embodiments of the present application, one end of the battery module 200 can abut against one of the second walls 120 via the first elastic support portion 224, and the other end is fixedly connected to the other second wall 120, or both ends of the battery module 200 abut against the corresponding second walls 120 via the first elastic support portion 224. In addition, when the battery cell arrangement structure 210 is not expanded, the first elastic support portion 224 abuts against the second wall 120, which can mean that the first elastic support portion 224 is just in contact with the second wall 120 and the first elastic support portion 224 is in a undeformed state, or can mean that the first elastic support portion 224 abuts against the second wall 120 and is in a deformed state, and the embodiments of the present application are not limited thereto.

Optionally, in an embodiment of the present application, the battery module 200 is in interference fit with the box body 100, and the first elastic support portion 224 is configured to absorb interference magnitude in the first direction A1 by producing elastic deformation. That is, in the embodiment, when the battery cell arrangement structure 210 is not expanded, the first elastic support portion 224 abuts against the second wall 120 and is in the deformed state. In addition to providing the installation positioning in the first direction A1 for the battery module 200 as mentioned above, this arrangement also has at least the following two advantages: first, after the battery module 200 is assembled in place, the first elastic support portion 224 provides assembly allowance in the first direction A1 for the battery module 200, so that a size error of the battery module 200 in the first direction A1 can be offset by the deformation of the first elastic support portion 224, for example, when a size of the battery module 200 in the first direction A1 is larger than an installation size of the box body 100 in a corresponding direction, the battery module 200 can be smoothly loaded in the box body 100 through the deformation of the first elastic support portion 224, and thus requirements on processing and assembly accuracy of the battery module 200 in the first direction A1 are reduced; second, when the battery module 200 is assembled in place, since the first elastic support portion 224 is in the deformed state, reaction force of the second wall 120 can be sent to the battery cell arrangement structure 210, as the battery cell 211 is subjected to a certain amount of pressure, it is conducive to ensuring a good contact of interfaces of a positive electrode sheet and a negative electrode sheet inside the battery cell 211.

As shown in FIG. 12, in an embodiment of the present application, the box body 100 further includes a pair of third walls 130, the pair of third walls 130 are connected to the first wall 110 and extend upward, the pair of third walls 130 are arranged opposite to each other along a second direction A2, and the second direction A2 intersects the first direction A1. Optionally, as shown in FIG. 11, the second direction A2 can be perpendicular to the first direction A1, and the second direction A2 can be the length direction of the end plate 220.

Figure 13:
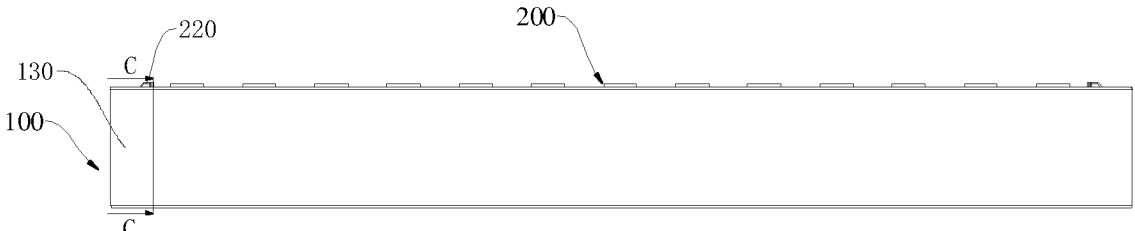
FIG. 13 is a main view schematic diagram of a battery provided by an embodiment of the present application.
Figure 14:
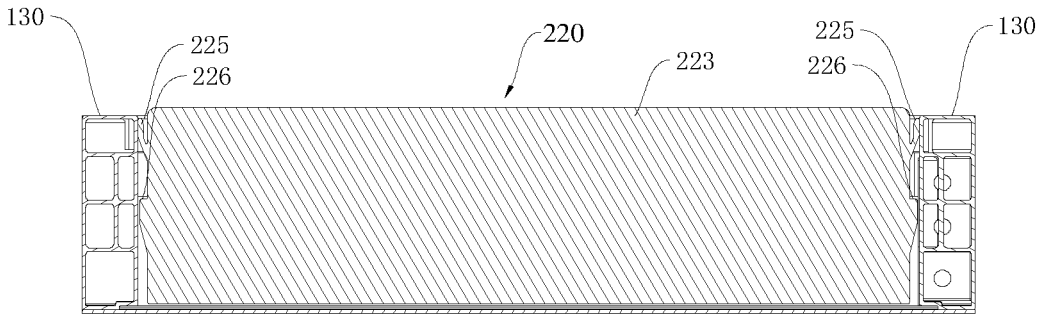
FIG. 14 is a cross-sectional schematic diagram along C-C line in FIG. 13.
Figure 15:
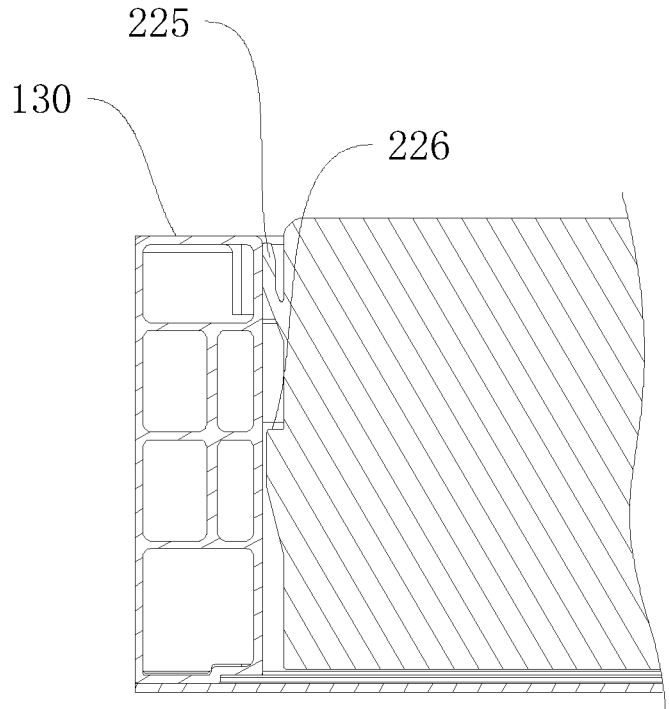
FIG. 15 is a partially enlarged schematic diagram of FIG. 14.

As shown in FIGS. 13-15, the end plate 220 further includes a second elastic support portion 225, and the second elastic support portion 225 is used to abut against the third wall 130 to implement a positioning of the battery module 200 in the second direction A2. On the basis of this, when the battery module 200 is installed in the box body 100, the second elastic support portion 225 abuts against the third wall 130 to provide an installation positioning in the second direction A2 for the battery module 200, which ensures the installation reliability of the battery module 200 in the second direction A2.

Here, when the battery cell arrangement structure 210 is not expanded, the second elastic support portion 225 abuts against the third wall 130, which can mean that the second elastic support portion 225 is just in the contact with the third wall 130 and the second elastic support portion 225 is in the undeformed state, or can mean that the second elastic support portion 225 abuts against the third wall 130 and is in the deformed state, and the embodiments of the present application are not limited thereto.

Optionally, in an embodiment of the present application, the battery module 200 is in interference fit with the box body 100, and the second elastic support portion 224 is configured to absorb interference magnitude in the second direction A2 by producing elastic deformation. That is, in the embodiment, when the battery cell arrangement structure 210 is not expanded, the second elastic support portion 225 abuts against the second wall 130 and is in the deformed state. In addition to providing the installation positioning in the second direction A2 for the battery module 200 as mentioned above, this arrangement also has at least the following two advantages: first, after the battery module 200 is assembled in place, the second elastic support portion 225 provides the assembly allowance in the second direction A2 to the battery module 200, so that the size error of the battery module 200 in the second direction A2 can be offset by the deformation of the second elastic support portion 225, for example, when the size of the battery module 200 in the second direction A2 is larger than the installation size of the box body 100 in a corresponding direction, the battery module 200 can be smoothly loaded in the box body 100 through the deformation of the second elastic support portion 225, and thus the requirements on the processing and assembly accuracy of the battery module 200 in the second direction A2 are reduced; second, when the battery module 200 is assembled in place, since the second elastic support portion 225 is in the deformed state, the reaction force of the third wall 130 can be sent to the battery cell arrangement structure 210, as the battery cell 211 is subjected to the certain amount of the pressure, it is conducive to ensuring the good contact of the interfaces of the positive electrode sheet and the negative electrode sheet inside the battery cell 211.

It should be noted that in the embodiments of the present application, the second elastic support portion 225 can be arranged between the battery module 200 and one of the third walls 130, that is, the second elastic support portion 225 is only arranged on one side of the end plate 220, or the second elastic support portion 225 can be arranged between the battery module 200 and the pair of third walls 130, that is, the second elastic support portion 225 is arranged on both opposite sides of the end plate 220.

Optionally, as shown in FIG. 14, the end plate body 223 is provided with the second elastic support portion 225 on both opposite sides along the second direction A2.

In the embodiments shown in FIGS. 12-15, a projection of an accommodating cavity of the box body 100 for accommodating the battery module 200 on the horizontal plane is a rectangle, the first direction A1 is a length direction of the rectangle, and the second direction A2 is a width direction of the rectangle. The battery module 200 is provided with the first elastic support portion 224 and the second elastic support portion 225 in the first direction A1 and the second direction A2 respectively, which can provide the reliable installation positioning for the battery module 200.

It can be understood that in other embodiments of the present application, the projection of the accommodating cavity of the box body 100 for accommodating the battery module 200 on the horizontal plane can be other shapes, such as a combination of the rectangle and a trapezoid.

Figures 16, 17:
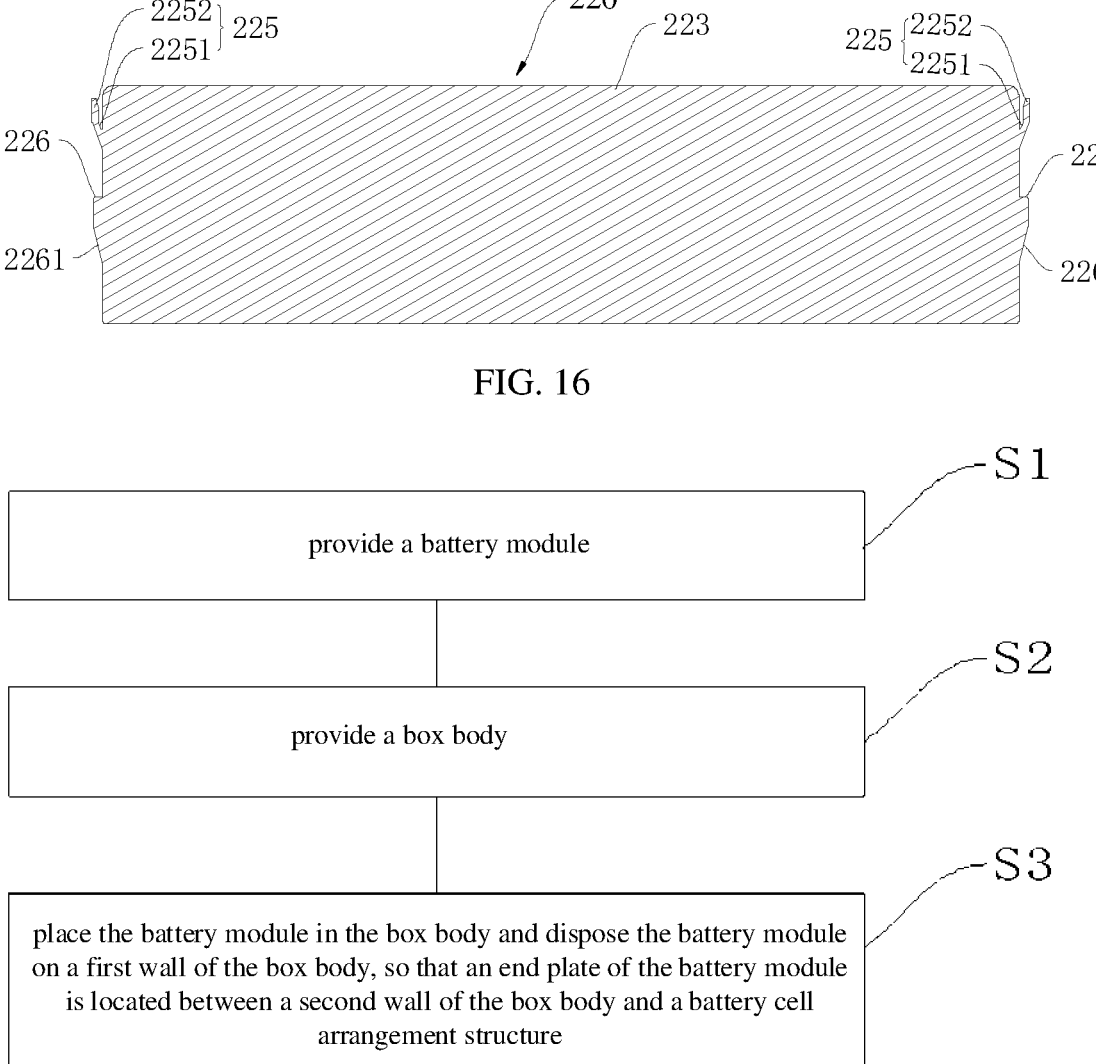
FIG. 16 is a cross-sectional schematic diagram along a second direction of an end plate provided by an embodiment of the present application.
FIG. 17 is a schematic flowchart of a method for producing a battery provided by an embodiment of the present application.

As shown in FIG. 15 and FIG. 16, in an embodiment of the present application, at least a part of the second elastic support portion 225 extends upward from the end plate body 223 towards the second wall 130. In this way, an upward extending part of the second elastic support portion 225 can abut against the third wall 130 to implement the installation positioning of the second elastic support portion 225 and the third wall 130.

The embodiments of the present application do not limit the specific structure of the second elastic support portion 225. Optionally, as shown in FIG. 16, in an embodiment of the present application, the second elastic support portion 225 includes a first section 2251 and a second section 2252, the first section 2251 extends obliquely upward from the end plate body 223 towards the third wall 130, the second section 2252 extends upward from an end of the first section 2251 away from the end plate body 223, and the second section is used to abut against the third wall 130. On the basis of this, the first section 2251 is arranged obliquely upward, which can play a certain guide role. The second section 2252 extends along the up and down direction, and can form surface contact with the third wall 130, which is conducive to extrusion and fitting of the two. Moreover, the second section 2252 has a gap with the end plate body 223, which is conducive to the deformation of the second section 2252 when being in contact with the third wall 130.

In other embodiments of the present application, the second elastic support portion 225 can be constructed as an elastic long strip extending along the up and down direction.

In order that the battery module 200 is smoothly loaded in the box body 100, as shown in FIG. 16, in an embodiment of the present application, the end plate 220 further includes a guide portion 226, the guide portion 226 is located below the second elastic support portion 225, the guide portion 226 has a guide chamfer 2261, and the guide chamfer 2261 is used to guide when the end plate 220 is loaded in the box body 100.

In order to prevent the guide portion 226 from affecting the normal operation of the second elastic support portion 225, as shown in FIG. 15, in an embodiment of the present application, the guide portion can have a gap with the third wall 130. In other words, as shown in FIG. 16, a height of the guide portion protruding from the end plate body 223 in the second direction A2 is smaller than a height of the second elastic support portion 225 protruding from the end plate body 223 in the second direction A2.

In the embodiments of the present application, a lower end of the battery cell arrangement structure 210 can be attached to the first wall 110, and a lower end of the end plate 220 has a gap with the first wall 110, so as to ensure contact between the battery cell arrangement structure 210 and the first wall 110.

It should be noted that "attach" in the above can mean that the lower end of the battery cell arrangement structure 210 is in contact with but not connected to the first wall 110, or can mean that the lower end of the battery cell arrangement structure 210 is in contact with and connected to the first wall 110, for example, the two are bonded via the glue.

Figure 18:
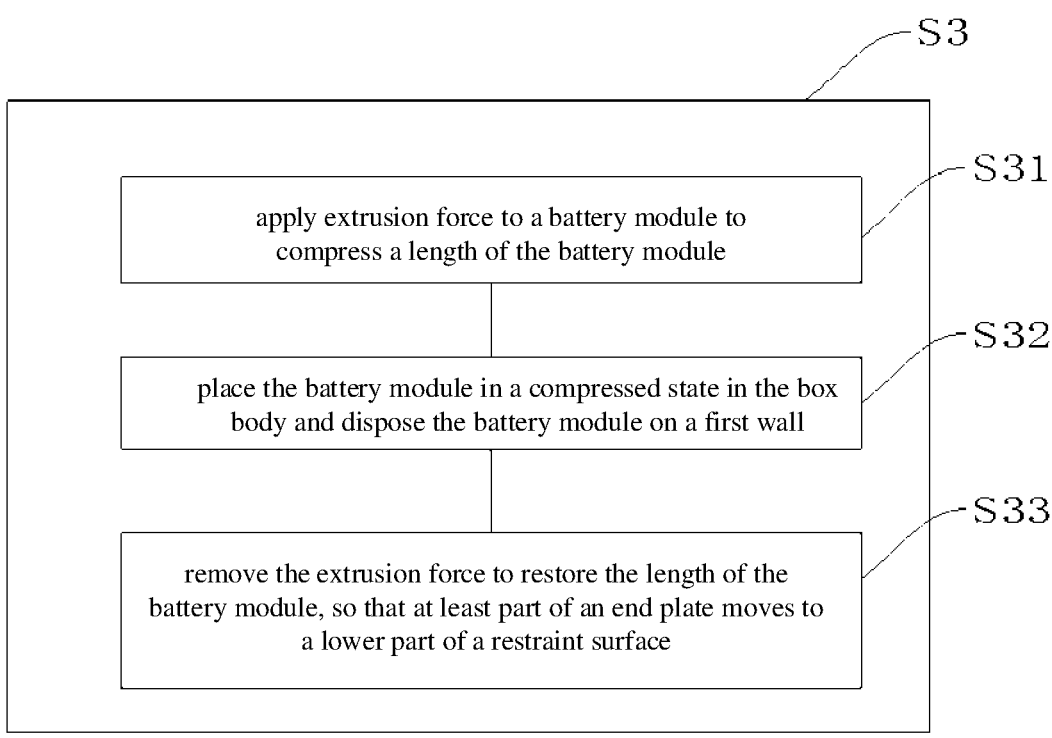
FIG. 18 is a schematic flowchart of a method for putting a battery module into a box body provided by an embodiment of the present application.

As shown in FIG. 17 and FIG. 18, according to another aspect of the present application, a method for producing a battery 10 is provided, for example, the method for producing the battery 10 mentioned above, and the method includes the following steps:

S1: provide a battery module 200, the battery module 200 includes a battery cell arrangement structure 210 and an end plate 220, the battery cell arrangement structure 210 includes a plurality of battery cells 211 stacked upon each other, for example, stacked upon each other along a first direction A1, and the end plate 220 is fixedly connected to the battery cell arrangement structure 210;

S2: provide a box body 100, the box body 100 includes a first wall 110 and a second wall 120, the second wall 120 is connected to the first wall 110 and extends upward, the second wall 120 is provided with a restraint surface 121, and the restraint surface 121 is used to abut against the end plate 220 to restrict the end plate 220 from moving upward; and S3: put the battery module 200 into the box body 100 and place the battery module 200 on the first wall 110, so that the end plate 220 is located between the second wall 120 and the battery cell arrangement structure 210, and the end plate 220 can move towards the second wall 120 when the battery cell arrangement structure 210 expands, to provide expansion space for the battery cell arrangement structure 210.

Among them, the battery module 200 and the box body 100 can be the above battery module 200 and the box body 100.

Optionally, as shown in FIG. 18, the step of putting the battery module 200 into the box body 100 and placing the battery module 200 on the first wall 110 (that is, Step S3) can include the following sub-steps:

S31: apply extrusion force to the battery module 200 to compress a length of the battery module 200;

S32: put the battery module 200 in a compressed state into the box body 100 and place the battery module 200 on the first wall 110;

S33: remove the extrusion force to restore the length of the battery module 200, so that at least a part of the end plate 220 moves to a lower part of the restraint surface 121. In this way, when the battery cell arrangement structure 210 expands, the end plate 220 can abut on the restraint surface 121 to prevent the battery module 200 from disengaging upward from the box body 100.

Among them, the above restraint protrusion 221 can be arranged on the end plate 220 to cooperate with the restraint surface 121.

It should be noted that, the features in the embodiments of the present application can be mutually combined provided that no conflict is caused.

The above descriptions are only preferred embodiments of the present application, and are not intended to limit the present application. For those skilled in the art, the present application can have various modifications and changes. Any modification, equivalent replacement, improvement, or the like made within the spirit and principle of this application shall fall within the protection scope of this application.

What is claimed is:

1. A battery, comprising:
   a box body, comprising a first wall and a second wall, and the second wall is connected to the first wall and extends upward; and
   a battery module, being arranged in the box body and located above the first wall, the battery module comprises a battery cell arrangement structure and an end plate, the battery cell arrangement structure comprises a plurality of battery cells stacked along a first direction, the end plate is arranged between the second wall and the battery cell arrangement structure, and the end plate is fixedly connected to the battery cell arrangement structure;
   wherein a restraint surface is arranged on the second wall, the restraint surface is configured to abut against the end plate to restrict the end plate from moving upward; and the end plate is configured to be capable of moving towards the second wall when the battery cell arrangement structure expands, to provide expansion space for the battery cell arrangement structure; and
   wherein the second wall is partially recessed towards a surface of the end plate to form a groove, and an upper side wall of the groove is the restraint surface.

2. The battery according to claim 1, wherein the end plate is provided with a restraint protrusion, and an upper surface of the restraint protrusion is configured to abut against the restraint surface to restrict the end plate from moving upward.

3. The battery according to claim 2, wherein the restraint protrusion extends horizontally towards the second wall.

4. The battery according to claim 2, wherein the upper surface of the restraint protrusion has a gap with the restraint surface in an up and down direction when the battery cell arrangement structure is not expanded.

5. The battery according to claim 2, wherein the restraint protrusion has a gap with the second wall in the first direction when the battery cell arrangement structure is not expanded.

6. The battery according to claim 2, wherein the end plate further comprises an end plate body, the end plate body has a first surface facing the battery cell arrangement structure and a second surface facing away from the battery cell arrangement structure, and the restraint protrusion is arranged on the second surface.

7. The battery according to claim 1, wherein the end plate comprises a first elastic support portion, and the first elastic support portion is configured to be capable of abutting against the second wall and be pressed and deformed by the battery cell arrangement structure when the battery cell arrangement structure expands, to provide the expansion space for the battery cell arrangement structure.

8. The battery according to claim 7, wherein at least a part of the first elastic support portion extends obliquely upward towards the second wall.

9. The battery according to claim 7, wherein the end plate further comprises an end plate body, the end plate body has a first surface facing the battery cell arrangement structure and a second surface facing away from the battery cell arrangement structure, and the first elastic support portion is arranged on the second surface.

10. The battery according to claim 9, wherein the end plate is provided with a restraint protrusion, and an upper surface of the restraint protrusion is configured to abut against the restraint surface to restrict the end plate from moving upward, the restraint protrusion is arranged on the second surface, and a height of the first elastic support portion protruding from the second surface is greater than a height of the restraint protrusion protruding from the second surface.

11. The battery according to claim 9, wherein an orthographic projection of the first elastic support portion on a horizontal plane is a long-strip shape, a surface on which a long side of the long-strip shape is located is connected to the second surface, and a surface on which the other long side of the long-strip shape is located is configured to abut against the second wall.

12. The battery according to claim 9, wherein there are a plurality of the first elastic support portions, and the plurality of the first elastic support portions are arranged at intervals on the second surface along the up and down direction.

13. The battery according to claim 7, wherein the box body comprises a pair of second walls, the pair of second walls are arranged opposite to each other along the first direction, and the first elastic support portion abuts against the second wall when the battery cell arrangement structure is not expanded, to implement a positioning of the battery module in the first direction.

14. The battery according to claim 7, wherein the battery module is in interference fit with the box body, and the first elastic support portion is configured to absorb interference magnitude in the first direction by producing elastic deformation.

15. The battery according to claim 7, wherein the box body further comprises a pair of third walls, the pair of third walls are connected to the first wall and extend upward, the pair of third walls are arranged opposite to each other along a second direction, and the second direction intersects the first direction; and the end plate further comprises a second elastic support portion, and the second elastic support portion is configured to abut against the third wall to implement a positioning of the battery module in the second direction.

16. The battery according to claim 15, wherein the battery module is in interference fit with the box body, and the second elastic support portion is configured to absorb interference magnitude in the second direction by producing elastic deformation.

17. The battery according to claim 15, wherein the end plate further comprises an end plate body, the second elastic support portion comprises a first section and a second section, the first section extends obliquely upward from the end plate body towards the third wall, the second section extends upward from an end of the first section away from the end plate body, and the second section is configured to abut against the third wall.

18. The battery according to claim 15, wherein the end plate further comprises an end plate body and a guide portion, the guide portion is located below the second elastic support portion, the guide portion has a guide chamfer, and the guide chamfer is configured to guide when the end plate is loaded in the box body.

19. A power consumption device, comprising the battery according to claim 1.

\* \* \* \* \*